(12) United States Patent
Osakabe et al.

(10) Patent No.: US 8,540,238 B2
(45) Date of Patent: Sep. 24, 2013

(54) AUTOMATIC SHEET TRANSPORTING APPARATUS, AND AUTOMATIC DOCUMENT SCANNING APPARATUS WITH THE AUTOMATIC SHEET TRANSPORTING APPARATUS

(75) Inventors: Yoshinori Osakabe, Seto (JP); Takaaki Mukai, Iwakura (JP); Toshitaka Iwago, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 176 days.

(21) Appl. No.: 12/562,991

(22) Filed: Sep. 18, 2009

(65) Prior Publication Data

US 2010/0078881 A1    Apr. 1, 2010

(30) Foreign Application Priority Data

Sep. 26, 2008   (JP) .................. 2008-248488

(51) Int. Cl.
*B65H 31/08* (2006.01)
(52) U.S. Cl.
USPC ............ 271/212; 271/278; 271/207; 271/314
(58) Field of Classification Search
USPC ......................................... 271/212, 278, 207
See application file for complete search history.

(56) References Cited

U.S. PATENT DOCUMENTS

| | | | | |
|---|---|---|---|---|
| 2,988,236 A | * | 6/1961 | Shields | 414/789.1 |
| 3,396,966 A | * | 8/1968 | Solheim | 271/212 |
| 4,384,782 A | * | 5/1983 | Acquaviva | 399/373 |
| 4,413,901 A | * | 11/1983 | Kollar | 399/373 |
| 4,570,918 A | * | 2/1986 | Eisler | 271/3.05 |
| 4,787,616 A | * | 11/1988 | Sasaki et al. | 271/3.03 |
| 4,844,438 A | * | 7/1989 | Mistyurik et al. | 271/181 |
| 5,022,641 A | * | 6/1991 | Okada | 271/3.08 |
| 5,078,383 A | * | 1/1992 | Shiina et al. | 271/212 |

(Continued)

FOREIGN PATENT DOCUMENTS

| | | |
|---|---|---|
| CN | 1667519 A | 9/2005 |
| EP | 0990956 A2 | 4/2000 |

(Continued)

OTHER PUBLICATIONS

Japan Patent Office, Notice of Reasons for Rejection in counterpart Patent Application No. JP 2008-248488, mailed Sep. 29, 2010.

(Continued)

*Primary Examiner* — Michael McCullough
*Assistant Examiner* — Howard Sanders
(74) *Attorney, Agent, or Firm* — Baker Botts L.L.P.

(57) ABSTRACT

An automatic sheet transporting apparatus includes a transporting unit with a discharge roller, the transporting unit discharge a sheet onto a discharge tray configured that support discharged sheets in a stack. A discharge guide, positioned on an upstream side of the discharge tray in a sheet discharging direction, guides a subsequent sheet transported by the transporting unit to a position between the discharge tray and a bottom surface of a previously discharged sheet in the stack. The discharge tray includes at least one rotating member that rotates when the discharge guide guides the subsequent sheet between the discharge tray and the bottom surface of the previously discharged sheet in the stack. The frictional resistance applied to the subsequent sheet is reduced to increase the number of sheets that can be stacked in the discharge tray.

17 Claims, 12 Drawing Sheets

(56) References Cited

U.S. PATENT DOCUMENTS

| | | | |
|---|---|---|---|
| 5,207,418 A * | 5/1993 | Oakes et al. | 271/212 |
| 5,215,301 A * | 6/1993 | Oshino et al. | 271/212 |
| 5,451,038 A * | 9/1995 | Hosking et al. | 271/3.01 |
| 6,095,517 A | 8/2000 | Dinatale | |
| 6,634,852 B2 * | 10/2003 | Bakoledis | 414/789 |
| 2005/0212195 A1 | 9/2005 | Ohama et al. | |
| 2005/0242494 A1 * | 11/2005 | Gunschera et al. | 271/256 |
| 2007/0210512 A1 * | 9/2007 | Sakakibara et al. | 271/314 |
| 2008/0099983 A1 * | 5/2008 | Hayashi | 271/207 |
| 2008/0138188 A1 * | 6/2008 | Pillard | 414/798.2 |

FOREIGN PATENT DOCUMENTS

| | | |
|---|---|---|
| EP | 1575259 A1 | 9/2005 |
| JP | S63-235248 A | 9/1988 |
| JP | H04-106064 A | 4/1992 |
| JP | H04-173651 A | 6/1992 |
| JP | H06-016347 U | 3/1994 |
| JP | H07-008356 U | 2/1995 |
| JP | 2000-118822 A | 4/2000 |
| JP | 2003-076074 A | 3/2003 |
| JP | 2005-247575 A | 9/2005 |

OTHER PUBLICATIONS

Japan Patent Office, Notice of Reasons for Rejection for Japanese Patent Application No. 2008-248488, mailed Apr. 6, 2011.

Japan Patent Office, Decision for Final Rejection for Japanese Patent Application No. 2008-248488, mailed Aug. 17, 2011.

European Patent Office, extended European Search Report for European Patent Application No. 09252259.8, dated May 4, 2012.

The State Intellectual Property Office of the People's Republic of China, Notification of the First Office Action for Chinese Patent Application No. 200910178702.8, issued Nov. 15, 2010.

The State Intellectual Property Office of the People's Republic of China, Notification of the Second Office Action for Chinese Patent Application No. 200910178702.8, issued Mar. 14, 2012.

The State Intellectual Property Office of the People's Republic of China, Notification of the Third Office Action for Chinese Patent Application No. 200910178702.8 (counterpart Chinese patent application), issued Nov. 2, 2012.

State Intellectual Property Office of the People's Republic of China, Decision on Rejection for Chinese Patent Application No. 200910178702.8 (counterpart to above-captioned patent application), mailed Apr. 28, 2013.

* cited by examiner

AUTOMATIC SHEET TRANSPORTING APPARATUS, AND AUTOMATIC DOCUMENT SCANNING APPARATUS WITH THE AUTOMATIC SHEET TRANSPORTING APPARATUS

CROSS REFERENCE TO RELATED APPLICATION

The present application claims priority to Japanese Patent Application No. 2008-248488, which was filed on Sep. 26, 2008, the disclosure of which is incorporated herein by reference in its entirety.

BACKGROUND OF THE INVENTION

1. Field of the Invention

The present invention relates to an automatic sheet transporting apparatus configured to separate and transport sheets stacked on a feed tray portion one by one to a discharge tray portion, and an automatic document scanning apparatus having this automatic sheet transporting apparatus and a scanning device configured to scan an image of a transported document at a scanning position. Also, the invention relates to an automatic sheet transporting apparatus configured to be capable of guiding a succeeding sheet or document to be discharged in between a sheet or document already discharged on a paper discharge tray portion and the discharge tray portion and then transporting the succeeding sheet or document smoothly, and an automatic document scanning apparatus having this automatic sheet transporting apparatus.

2. Description of the Related Art

In general, in an image scanning apparatus which is capable of scanning an image surface of a transported document, an image scanning device such as a CIS (Contact Image Sensor) or a CCD (Charge Coupled Device) unit is arranged on a lower surface of a document passage transparent panel (glass plate). An automatic document transporting apparatus provided in a lid-type cover member, which is openable and closable with respect to an upper surface of the document passage transparent panel, separates and transports a plurality of documents stacked on a paper feed tray portion one by one to the document passage transparent panel, then the image scanning device scans the image surface of the transported document, and then the document is discharged on a paper discharge tray portion.

A document transporting path in this case is formed into a U-shape extending from the paper feed tray portion for documents arranged on the upper side to a paper discharge tray portion arranged on the lower side via a document scanning position, which is provided in an automatic document scanning apparatus of an upper paper feeding system as shown in JP-A-2003-76074, and a type formed into an U-shape extending from the paper feed tray portion for documents arranged on the lower side to the paper discharge tray portion arranged on the upper side via the document scanning position, which is provided in an automatic document scanning apparatus known as a lower paper feeding system as shown in JP-A-2005-247575.

In the automatic document scanning apparatus of the lower paper feeding system, a plurality of documents are stacked with the image surfaces down on the paper feed tray portion, and the documents are separated and transported one by one from the lower most document to a scanner. Then, in the scanner, the documents are transported with the image surfaces opposed to an upper (front) surface of the document passage transparent panel and, when the documents are discharged to the paper discharge tray portion via the U-shaped document transporting path, are stacked thereon with the image surfaces up.

In the case of the automatic document scanning apparatus of the lower paper feeding system, when the heightwise position of a nip of a paper discharging roller pair arranged at a terminal end of the U-shaped document transporting path is higher than an upstream end of the paper discharge tray portion in terms of discharging direction, the succeeding documents are stacked on the upper surface of the previously discharged documents.

Accordingly, the order of documents stacked in the paper discharge tray portion with the image surfaces up is completely reverse from the order of the documents stacked in the paper feed tray portion. In order to arrange these documents in the original order, it is necessary to manually rearrange the document order, which may take a great deal of time and effort.

Therefore, in JP-A-2005-247575, the heightwise position of the nip of the paper discharging roller pair arranged at the terminal end of the U-shaped document transporting path is set to be lower than the upstream end of the paper discharge tray portion in terms of the discharging direction so that the succeeding documents discharged therefrom are guided to the underside of the previously discharged documents (this is referred to as "slip" under or in). Consequently, the documents are stacked on the paper discharge tray portion in the same order as the order of the documents stacked in the paper feed tray portion (hereinafter, referred to as "same order stacking").

However, if the number of documents stacked in the paper discharge tray portion is increased, the weight of the stacked documents is also increased. Then, the subsequently discharged document is subjected to increased frictional resistance when being transported further after having slipped between the previously discharged documents stacked in the paper discharge tray portion and the paper discharge tray portion. Consequently, even though the subsequently discharged documents can be slipped in between the paper discharge tray portion and the previously stacked documents, the slipped documents cannot be transported smoothly any longer.

In contrast, in JP-U-H07-8356, in the automatic document scanning apparatus of the upper paper feeding system, documents placed on the paper feed tray portion with image surfaces down are scanned by the scanner arranged on the inner diameter side of the document transporting path in the U-shape, and are discharged on the paper discharge tray portion arranged at a lower level than the paper feed tray portion with the image surfaces up. In this type as well, a configuration in which an angular protrusion in lateral cross section is provided on the upstream end of the paper discharge tray portion in terms of the discharging direction so as to lift the rear end side of the discharged documents upward, and a freely rotatable roller is provided on the surface of the angular protrusion is proposed as a device for guiding the subsequently discharged documents smoothly on the underside of the documents discharged previously in order to stack the documents in the same order. In this configuration, the resistance that the subsequently discharged document is subjected to may be reduced when slipping in between the previously discharged documents and the angular protrusion. Consequently, the subsequently discharged documents can be transported more smoothly.

However, when the number of documents stacked in the paper discharge tray portion is increased, the frictional resistance between the documents previously discharged and stacked and the paper discharge tray portion is increased on the downstream side of the paper discharge tray portion in terms of the discharging direction (the position where the above-described roller is not arranged). Consequently, after the subsequently discharged document has slipped in between the paper discharge tray portion and the previously stacked documents, the document cannot be transported smoothly any longer. Therefore, there is a problem such that the allowable number of documents to be discharged and stacked cannot be increased.

SUMMARY OF THE INVENTION

In order to solve the problems as described above, it is an object of the present invention to provide an automatic sheet transporting apparatus including a device configured to reduce a frictional resistance that a subsequent sheet or document is subjected to when the subsequent sheet or document is guided in between the discharge tray portion and the previous sheet or document stacked on the discharge tray, so that the number of sheets or documents to be stacked on the discharge tray portion may be increased. A further object of the invention is to provide an automatic document scanning apparatus having the automatic sheet transporting apparatus configured to reduce the frictional resistance of the subsequent sheet or document to increase the number of sheets or documents that may be stacked on the discharge tray portion.

An automatic sheet transporting apparatus, according an embodiment of the invention, includes a transporting unit having a discharge roller and configured to discharge a sheet. A discharge tray supports sheets discharged from the transporting unit in a stack. A discharge guide, which is positioned on an upstream side of the discharge tray in a sheet discharging direction, guides a subsequent sheet transported by the transporting unit to a position between the discharge tray and a bottom surface of a previously discharged sheet in the stack. The discharge tray includes at least one rotating member that rotates when the discharge guide guides the subsequent sheet to the position between the discharge tray and the bottom surface of the previously discharged sheet in the stack.

An automatic document scanning apparatus, according to another embodiment of the invention, includes an automatic document transporting apparatus, a scanning member configured to scan an image on a sheet at a scanning position; and a reversing member configured to reverse a conveying direction of the sheet from the scanning position to a sheet discharging direction. The automatic document transporting apparatus includes a transporting unit having a discharge roller that discharges a sheet to a discharge tray configured to support at least one sheet discharged from the transporting unit in a stack. A discharge guide, which is positioned on an upstream side of the discharge tray in the sheet discharging direction, guides a subsequent sheet transported by the transporting unit to a position between the discharge tray and a bottom surface of a previously discharged sheet in the stack. The discharge tray includes at least one rotating member that rotates when the discharge guide guides the subsequent sheet to the position between the discharge tray and the bottom surface of the previously discharged sheet in the stack.

An automatic sheet transporting apparatus, according to yet another embodiment of the invention, includes a discharge tray and a transporting means comprising a discharge roller for discharging a sheet onto the discharge tray. A discharge guide means, which is positioned on an upstream side of the discharge tray in a sheet discharging direction, guides a subsequent sheet transported by the transporting unit to a position between the discharge tray and a bottom surface of another sheet previously discharged onto the discharge tray. Provided at the discharge tray is at least one means for reducing frictional resistance applied to the subsequent sheet guided by the discharge guide means to the position between the discharge tray and the bottom surface of the previously discharged sheet.

Other objects, features, and advantages of embodiments of the present invention will be apparent to persons of ordinary skill in the art from the following description of preferred embodiments with reference to the accompanying drawings.

DESCRIPTION OF THE PREFERRED EMBODIMENTS

Embodiments of the invention and their features and technical advantages may be understood by referring to FIGS. 1-12B, like numerals being used for like corresponding portions in the various drawings. Image scanning apparatus 2 in a multifunctional apparatus 1 may include a facsimile function, a scanner function, a copying function, and a printer function. When the image scanning apparatus 2 executes a copying function automatically for a plurality of documents, the image scanning apparatus 2 and an automatic document transporting mechanism 3 scan images of the plurality of documents as image data. Then, the copying function may be achieved by printing the images on printed media (papers P) by a transporting device and a printing device provided in a body case 4 on the basis of the scanned image data.

Figure 1:
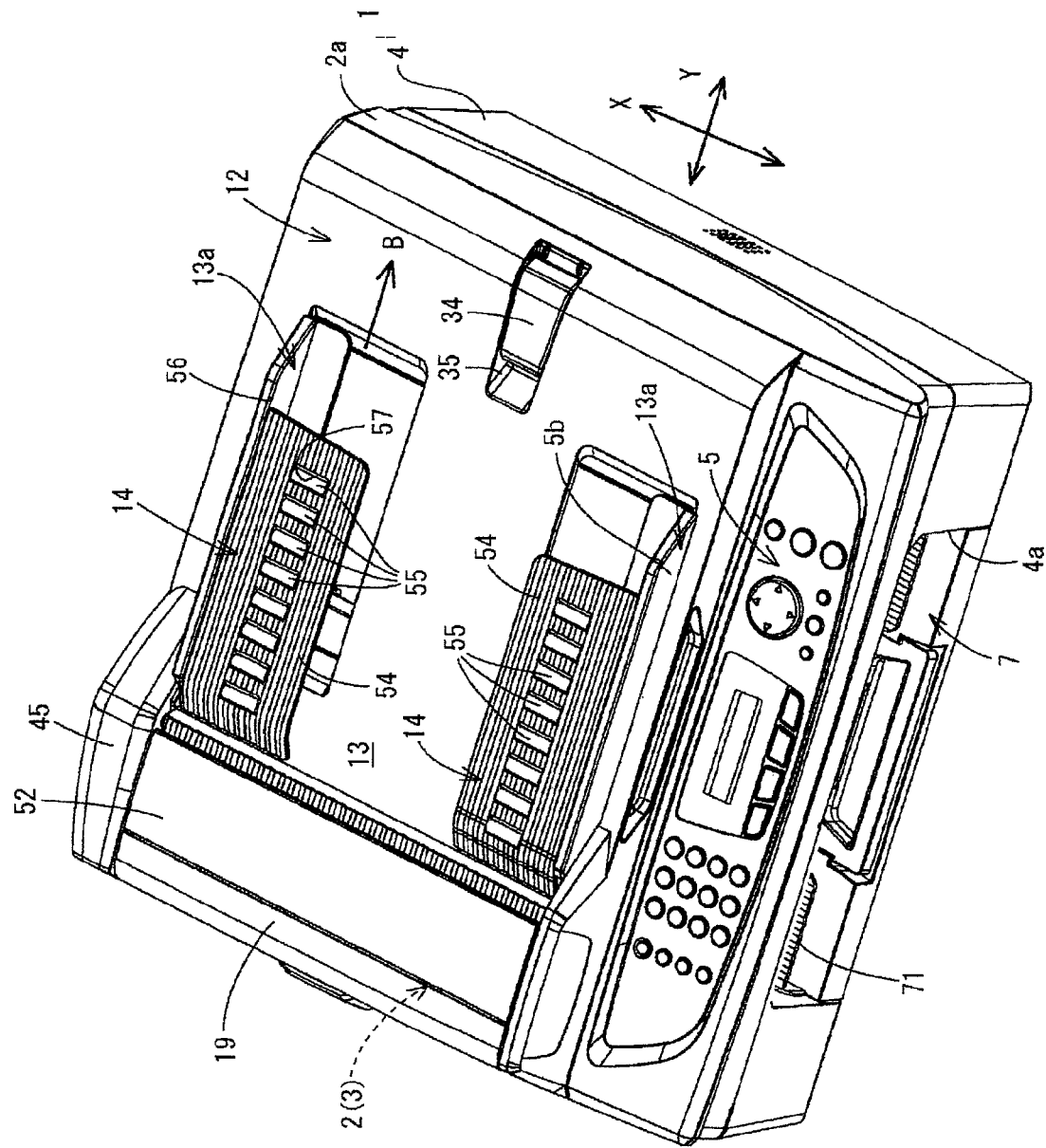
FIG. 1 is a perspective view of a multifunctional apparatus provided with an automatic document scanning apparatus according to an embodiment of the invention.
Figure 2:
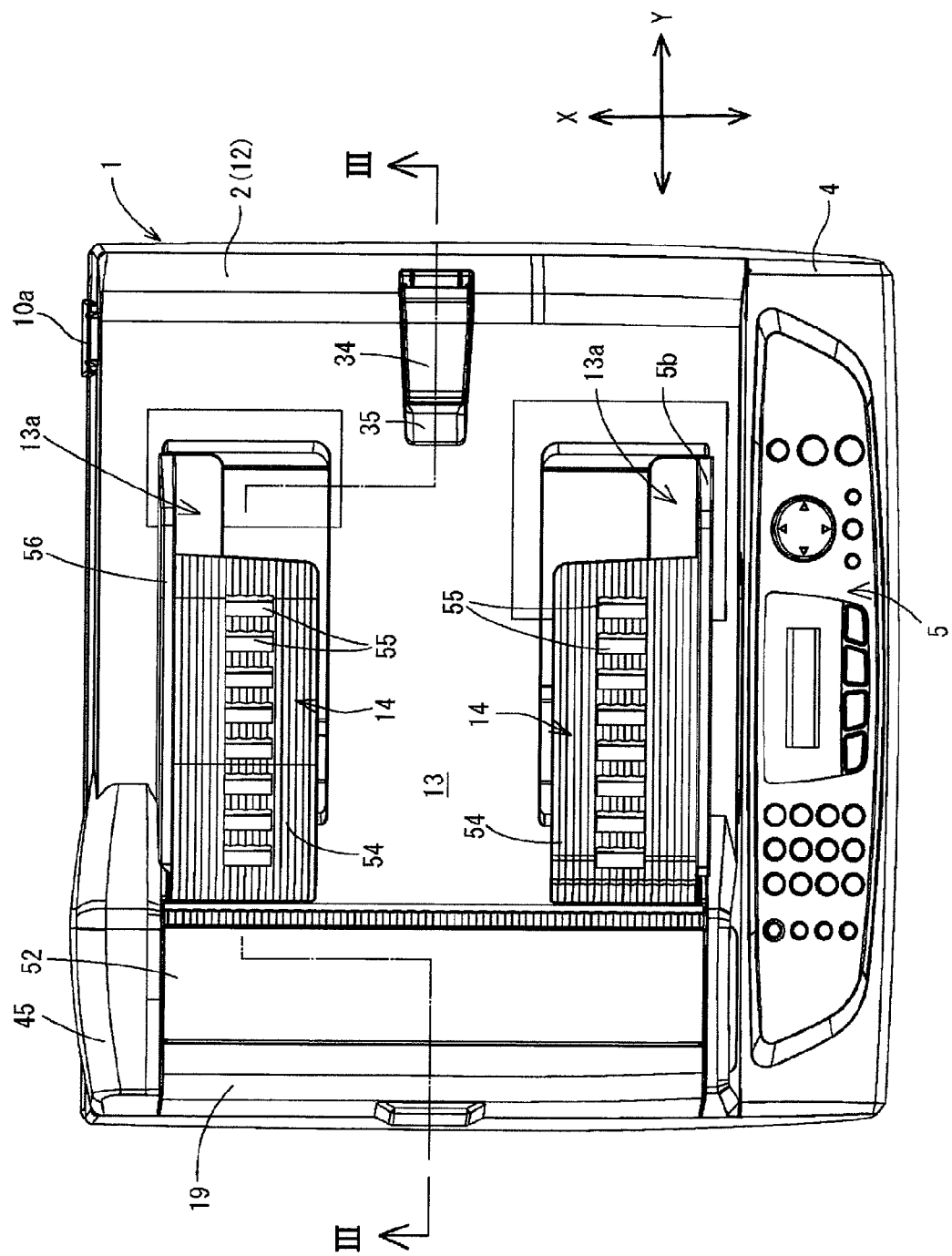
FIG. 2 is a plan view of the same.

As shown in FIG. 1 and FIG. 2, arranged on a front portion of an upper surface of body case 4 of the multifunctional apparatus 1 may be an operation panel portion 5 having a numeric keypad for executing the facsimile function, the scanner function, and the copying function, button keys configured to issue commands of various operations, a liquid crystal panel configured to display contents of the commands or error messages. Hereinafter, a side where operation panel portion 5 of the body case 4, which may be formed of synthetic resin, may be located is referred to as "front" (near side) and with reference thereto, as "back" (inner, rear surface), "left", and "right" of the apparatus. Also, as described above, the fore-and-aft direction of the multifunctional apparatus 1 is referred to as X-direction, and the lateral direction is referred to as Y-direction.

As shown in FIG. 1, a paper-feeding cassette 7 configured to be inserted for feeding the printed media (papers P) may be arranged in an opening 4*a* on the front side of body case 4 of multifunctional apparatus 1. An upper side of opening 4*a* may function as a paper discharging port from which the printed papers P are discharged. Papers P, stacked on paper-feeding cassette 7, may be transported to a printer 60, where the images are printed, and printed papers P may be discharged on a paper discharge tray 71 arranged above the paper-feeding cassette 7. A user may obtain papers P discharged on paper discharge tray 71 from opening 4*a*.

Figure 3:
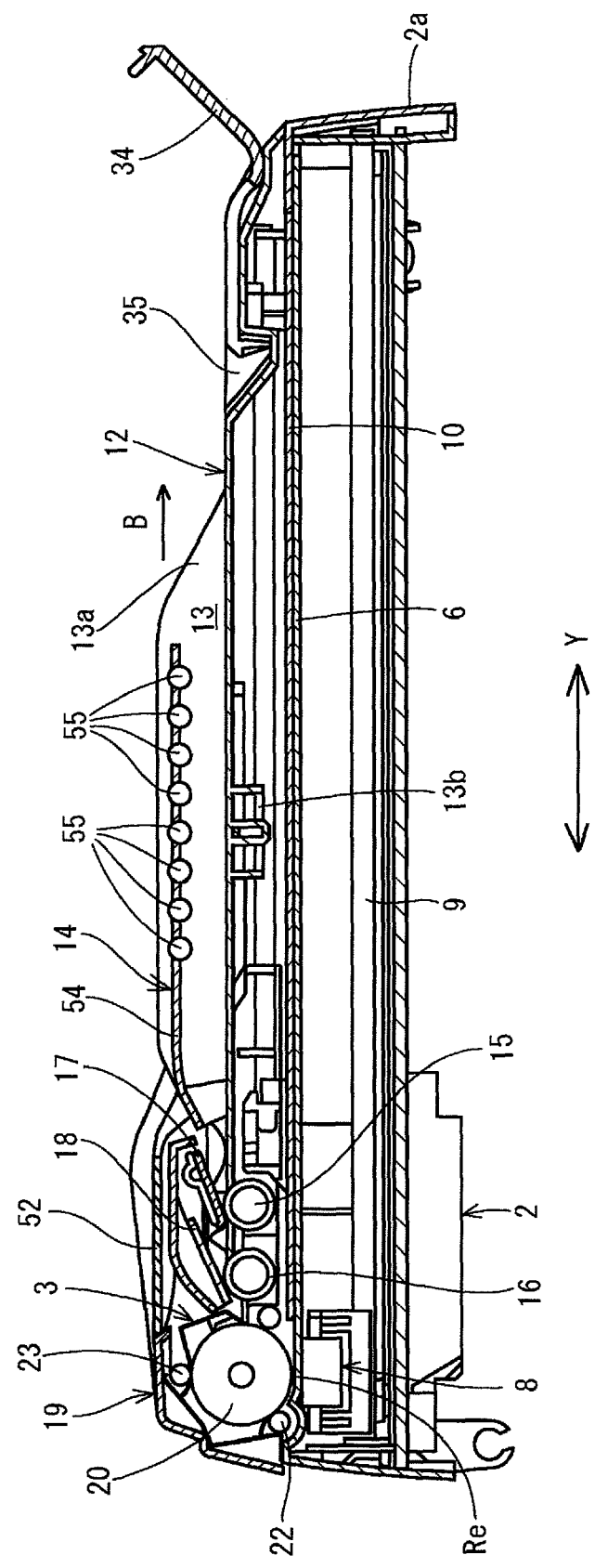
FIG. 3 is a cross-sectional view of the automatic document scanning apparatus taken along the line III-III in FIG. 2.
Figure 4:
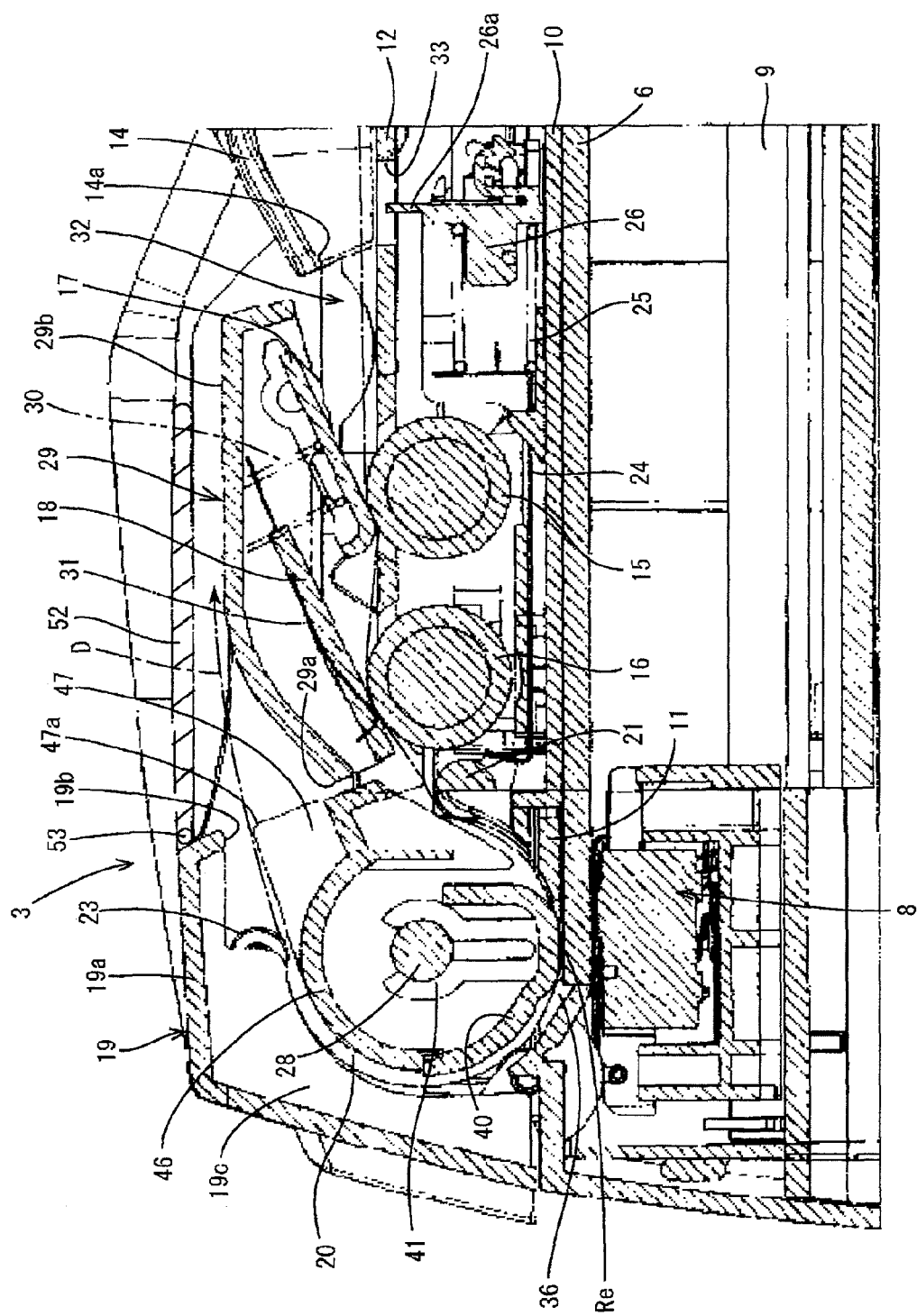
FIG. 4 is an enlarged cross-sectional view of a principal portion of an automatic document transporting mechanism.
Figure 5:
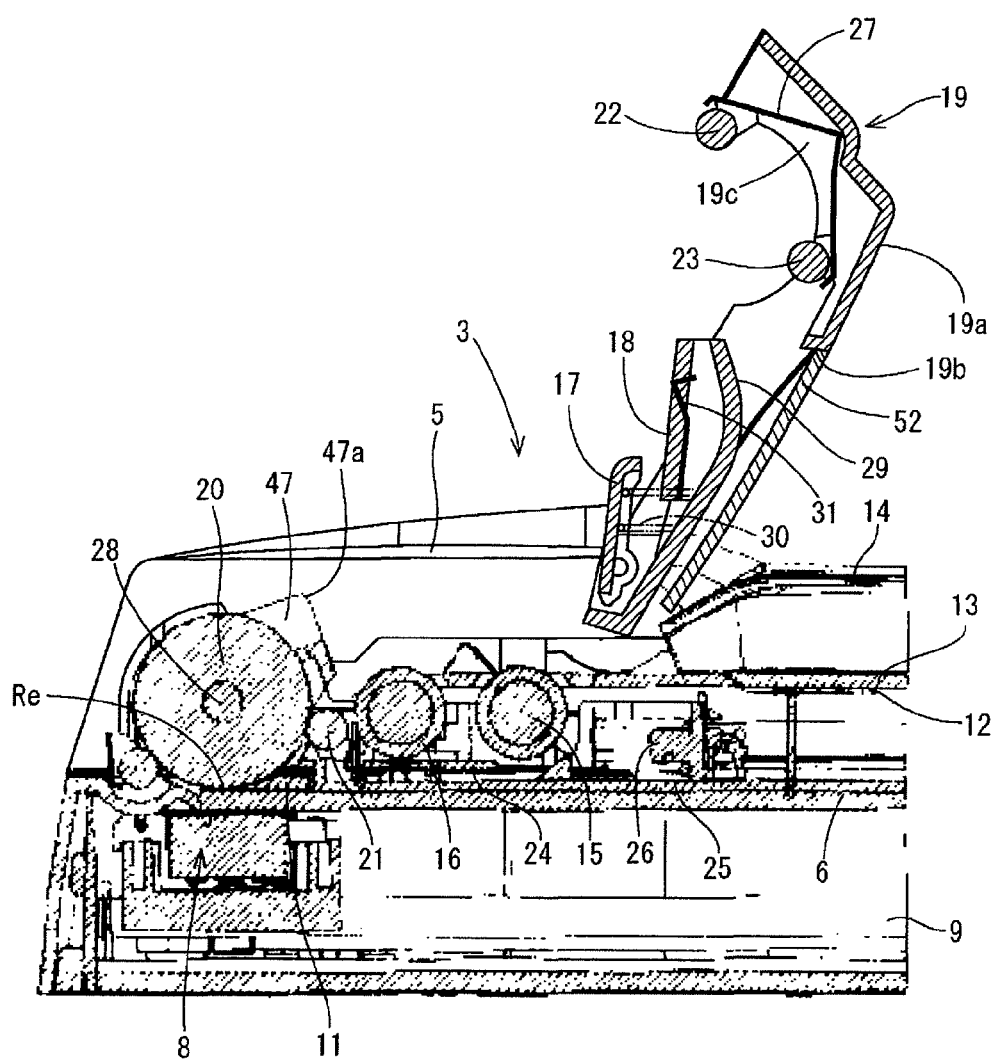
FIG. 5 is a cross-sectional view showing a state in which a lid cover member is opened.

Arranged on the rear side of operation panel portion 5 may be image scanning apparatus 2 configured to execute the scanner function and automatic document transporting mechanism 3 to be mounted thereon. As shown in FIG. 4 and FIG. 5, a glass panel 6 may be used as a transparent panel member for placing both a static document and a transported document on a case 2*a* of image scanning apparatus 2. A linear scanning device 8. e.g., a CIS (Contact Image Sensor), configured to scan image surfaces of the documents may be provided below the glass panel 6. Reciprocal linear scanning device 8, when placed on a linear guide shaft 9 along the Y-direction in FIG. 3, may be formed so as to be elongated in the X-direction in FIG. 1. Case 2*a* of the image scanning apparatus 2 may be mounted so as to be rotatable in the vertical direction about a pivot (not shown) provided horizontally in the body case 4 at the end on one side thereof Automatic document transporting mechanism 3 (also referred to as an ADF), which transports the document automatically to the image scanning apparatus 2, may be provided on top of a pressing panel portion 10 which presses the static document placed on glass panel 6 with the image surface in abutment therewith. Pressing panel portion 10, which may be formed of synthetic resin, may be mounted on case 2*a* at a rear end thereof (the opposite side from operation panel portion 5) so as to be rotatable in the vertical direction via hinges 10*a*. A holding member (not shown), which may be formed of sponge, and a white panel may be bonded to a lower surface of pressing panel portion 10.

As shown in FIG. 4 and FIG. 5, exposure opening 36 may be at a position where scanning device 8 is kept stationary at a left end portion of the glass panel 6, which is an area on the left side from a guiding strip 11 elongated in the X-direction and bonded to an upper surface of glass panel 6. Documents D may be transported from exposure opening 36 in a first transporting direction with the image surface down are partly exposed therefrom, and the upper portion of a detecting position of the CIS corresponds to a scanning position Re of the transported document. A scanning area of the static document may be positioned on the right side from the guiding strip 11.

Figure 6:
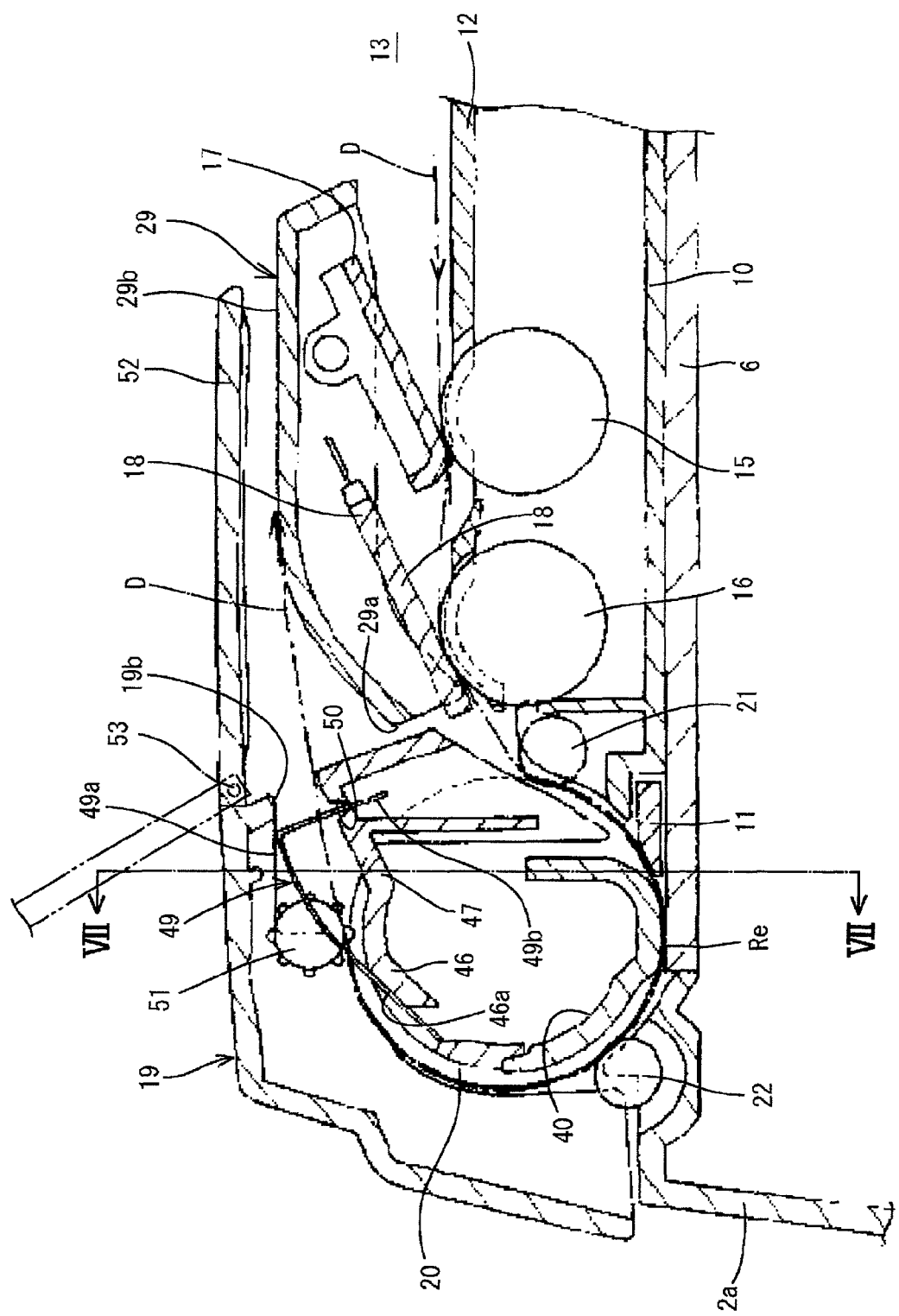
FIG. 6 is a cross-sectional view showing a portion of a resilient supporting strip.

Automatic document transporting mechanism 3 according to an embodiment of the present invention may be arranged so as to be adjacent to a paper feeding tray portion 13 formed on an upper surface of an upper cover 12, which covers substantially entirely over the pressing panel portion 10, and paper discharge tray portions 14 arranged above the paper feeding tray portion 13. Automatic document transporting mechanism 3 may have a length shorter than the paper feeding tray portion 13 in terms of Y-direction, as shown in FIGS. 3-5. Automatic document transporting mechanism 3 may include a substantially U-shaped document transporting path having a first transporting portion configured to transport documents D to scanning position Re, as shown in FIGS. 5-6, positioned on one end portion of paper feeding tray portion 13 (one end portion in the Y-direction), a second transporting portion configured to reverse the transporting direction via scanning position Re, and a third transporting portion following the second transporting portion to transport the documents D in sequence to paper discharge tray portions 14.

In contrast, paper discharge tray portions 14 may be integrally provided on the upper side of a pair of document guides 13*a* projecting from the upper surface of upper cover 12. Then, when one of the document guides 13*a* is moved by hand, a pair of the document guides 13*a* may be moved in the X-direction simultaneously, so that the width can be adjusted according to the widthwise dimension of documents D in the X-direction by means of an interlocking mechanism 13*b*, as shown in FIG. 3, having a known structure including a rack lever and a pinion meshed therewith. Because paper discharge tray portions 14 are short in the Y-direction, a portion of paper feeding tray portion 13 near the other end portion thereof (the opposite side farthest from the side where the document transporting path is arranged), may also serve as a stacking portion where documents D discharged after scanning are stacked. In this manner, since an upstream portion of paper feeding tray portion 13, in terms of the first transporting direction, also serves as the stacking portion where documents D after scanning are stacked, the height of a portion for stacking documents D may be reduced, so that downsizing of the apparatus is effectively achieved.

A document stopper body 34 may be provided at the other end portion (rearmost portion) of upper cover 12 (paper feeding tray portion 13). Document stopper body 34 may be configured to come into abutment with leading edges of discharged documents D and prevent documents D from being further transported beyond document stopper body 34, that is, to prevent documents D from slipping down from the rearmost portion of paper feeding tray portion 13. In this case, by employing a storable configuration then a compact configuration may be achieved, such as a foldable configuration by forming a depressed portion 35 opened upward to allow document stopper body 34 to be fitted therein on the rearmost portion of the upper cover 12 and securing a proximal portion of document stopper body 34 in depressed portion 35 so as to be capable of rotating upstream, wherein document stopper body 34 is not protruded out from paper feeding tray portion 13 or the upper side when the multifunctional apparatus 1 is not in use or is packed. In short, document stopper body 34 may be movable between an upright state rotated (stood upright) from a depressed portion 35 to a position which allows the leading edges of documents D to come into abutment therewith and a stored state in depressed portion 35 to prevent the leading edge of documents D from coming into abutment therewith.

Automatic document transporting mechanism 3 may include a separating and transporting device having first rotating members, e.g., an intake roller 15 and a separation roller 16, and a first abutting member, e.g., an intake nip strip 17 and a separation pad 18, configured to separate one of the plurality of documents D placed on paper feeding tray portion 13 in a stacked state in sequence from the lowermost (positioned at the bottom) document D and transport the same to the first transporting portion (in the direction toward scanning position Re), one or both of these members being able to come into resilient abutment with the other one of those or with respect to each other. Automatic document transporting mechanism 3 further may include a reversely transporting device including a second rotating member, e.g., a large-diameter reverse roller 20, provided on the second transporting portion configured to reverse the document transported by the separating and transporting device from scanning position Re and transport further onward and second abutting members configured to be capable of coming into resilient abutment with the second rotating member. In addition, automatic document transporting mechanism 3 may include a cover member (lid cover member 19) capable of rotating about a rotating shaft provided at a position apart from the reversely transporting device and closer to paper discharge tray portions 14 than to paper feeding tray portion 13. Cover member may include second abutting members, e.g., a second pinch roller 22 and a third pinch roller 23, arranged therein and capable of opening at least part of the transporting path for the documents.

As shown in FIGS. 3-5, an intake roller 15 and a separation roller 16 and large-diameter reverse roller 20, which serve as the second rotating member, may be arranged on the upper surface of pressing panel portion 10 at a substantially center portion in the direction orthogonal to the transporting direction of documents D, i.e., a sheet transporting direction or a predetermined transporting direction. The centerline of rotation of a drive shaft 28, which supports reverse roller 20, may overlap an axial line of scanning position Re in a plan view, so that the lower end surface of the peripheral surface of reverse roller 20 opposes a surface to be scanned by scanning device 8.

Intake nip strip 17 and separation pad 18 may come into resilient abutment with the upper surfaces of intake roller 15 and separation roller 16, respectively. Second pinch roller 22 and third pinch roller 23 may be freely rotatable and capable of coming into resilient abutment with reverse roller 20. Intake nip strip 17, separation pad 18, second pinch roller 22, and third pinch roller 23, may be arranged on an inner surface of substantially L-shaped lid cover member 19.

Second pinch roller 22 and third pinch roller 23 may be pivotably supported at both ends of a spring strip 27, which may be formed of a metallic panel of a substantially L-shape in cross section, and a midsection of spring strip 27 is secured to the inner surface of lid cover member 19. A first pinch roller 21 serving as the driven roller may be arranged on the downstream side of the separation roller 16 in terms of the transporting direction. First pinch roller 21 may come into abutment with reverse roller 20 when mounted on a frame 24, which may be formed of metal and arranged on the upper surface of pressing panel portion 10 so as to be movable in the Y-direction. A rear end of a compression coil spring 25 acting as an urging (spring) device may be configured to resiliently press a rear end of frame 24 against the reverse roller 20, spring 25 is supported by a supporting strip 26.

Lid cover member 19 may be provided with a paper discharge auxiliary guide panel 29, elongated along the direction of the width of documents D, as a discharging shoot member for guiding the U-turned documents D to paper discharge tray portions 14 on the downstream side of the third pinch roller 23 in terms of the transporting direction and on the upstream side of paper discharge tray portions 14 in terms of the discharging direction. A front end portion 29a, which is on the upstream side in terms of the transporting direction of paper discharge auxiliary guide panel 29, may be formed to be inclined downward to a level lower than the upper surface of reverse roller 20, and a portion between a front end edge of paper discharge auxiliary guide panel 29 and an end edge 19b of an upper roof 19a of lid cover member 19 may correspond to a discharge port for discharged documents D. A horizontal portion 29b of the upper surface of paper discharge auxiliary guide panel 29 may be provided at substantially the same height as the upper surface paper discharge tray portions 14.

A proximal portion of an upper guide member 52 may be mounted to a portion of upper roof 19a of lid cover member 19 in the vicinity of end edge 19b via a pivot 53 so as to be rotatable in the vertical direction. Upper guide member 52 may be arranged substantially horizontally over at least part of the upper portion of paper discharge auxiliary guide panel 29 as the discharging shoot member, and as shown in FIG. 6, for example, over the substantially entire length from inclined front end portion 29a to horizontal portion 29b in regular use, i.e., a state in which reverse roller 20 is covered with lid cover member 19. In this configuration, since the upstream side of the documents D previously discharged and stacked on paper discharge auxiliary guide panel 29 may be regulated by a lower surface of upper guide member 52, and, thus, the stacked state substantially parallel to horizontal portion 29b is maintained. Accordingly, the leading edges of subsequent documents D may be easily and smoothly guided to the underside of previously discharged and stacked documents D. A large number of discharged documents D may be stacked in the same order as those having been placed on paper feeding tray portion 13.

The proximal portion of upper guide member 52 also may be mounted to a portion in the vicinity of end edge 19b so as to be rotatable in the vertical direction. In this case, a configuration in which a free end edge of upper guide member 52 comes into abutment with the upper surface of paper discharge tray portions 14 or paper feeding tray portion 13 to maintain lid cover member 19 in an opened state.

Intake nip strip 17 and separation pad 18 may be capable of rotating in the vertical direction about the proximal ends (upper end sides) on the side of a lower surface of paper discharge auxiliary guide panel 29, and intake nip strip 17 may be pressed against and urged against intake roller 15 via a compression coil spring 30 as a pressing device, and separation pad 18 may be pressed against and urged against the upper surface of separation roller 16 via a leaf spring 31 as the pressing device. Since the configuration may be adapted to suck documents D on paper feeding tray portion 13 in between intake nip strip 17 and intake roller 15, the lower surface side of paper discharge auxiliary guide panel 29 corresponds to an intaking shoot portion 32 for documents D fed from paper feeding tray portion 13.

Lid cover member 19 may be configured to be rotatable in the vertical direction about a rotating shaft (not shown) located on the side of the lower surface of paper discharge auxiliary guide panel 29 projecting from both sides in the vicinity of the proximal portion of intake nip strip 17, which corresponds to a position close to the separating and transporting device, i.e., the far side from the reverse roller 20. Therefore, as shown in FIGS. 3-4, when lid cover member 19 is closed, the intake nip strip 17 may be resiliently pressed against the upper surface of intake roller 15, separation pad 18 may be resiliently pressed against the upper surface of separation roller 16, and each of second pinch roller 22 and third pinch roller 23 are resiliently pressed against the peripheral surface of reverse roller 20 on the side of the reverse rotation.

As shown in FIG. 5, for example, when lid cover member 19 is rotated open and upward, the second pinch roller 22 and the third pinch roller 23 may move away from reverse roller 20. Also, in this state, when lid cover member 19 is rotated by about 120°, intake nip strip 17 and separation pad 18 may move away from intake roller 15 and separation roller 16, respectively, whereby document D pinched at an abutment or nip portion between them can be removed easily, so that a paper jam may be resolved. Document D pinched at the abutment portion between first pinch roller 21 and reverse roller 20, which can be moved against an urging force of the coil spring 25 as the pressing device, may be pulled out irrespective of the urging force.

Documents D to be scanned may be stacked with the image surfaces down between lower surface of panel-shaped paper discharge tray portions 14 and paper feeding tray portion 13. By forming the paper discharge tray portions 14 so as to incline in such a manner that the height from the upper surface of paper feeding tray portion 13 to the horizontal lower surface of paper discharge tray portions 14 becomes lower at a distal end side 14a closer to intake roller 15, guiding operation of documents D stacked on paper feeding tray portion 13 in between intake roller 15 and intake nip strip 17 may be smoothly achieved. Also, by providing an intake device including intake roller 15 and intake nip strip 17, documents D stacked on horizontal paper feeding tray portion 13 may be reliably delivered to a position of a separating device including separation roller 16 and separation pad 18. In order to ensure this operation, the diameters and the peripheral speeds of intake roller 15 and separation roller 16 may be set to be the same.

As shown in FIG. 4, arranged on both left and right outer sides, in the width direction of documents D, with the intermediary of reverse roller 20 on the lower side may be pressing members 40 configured to press the image surface of document D against the surface of glass panel 6 without gap at the exposure opening including scanning position Re. Pressing members 40 may be molded, by injection molding of synthetic resin, integrally with flat panel shaped large pressing panel portion 10. In this case, the proximal portions, i.e., portions close to the end edges in the width direction of documents D, of the pressing members 40 may be integrally connected to portions in the vicinity of shaft supporting portions (not shown) of drive shaft 28 provided on the side portions of pressing panel portion 10. Referring to FIGS. 1-2, provided on the outside of the one of the shaft supporting portions may be a transmitting portion case 45 which allows storage of the drive shaft 28, a transmission gear mechanism for transmitting a rotational drive force to intake roller 15 and separation roller 16, respectively, and a drive motor.

Figure 7:
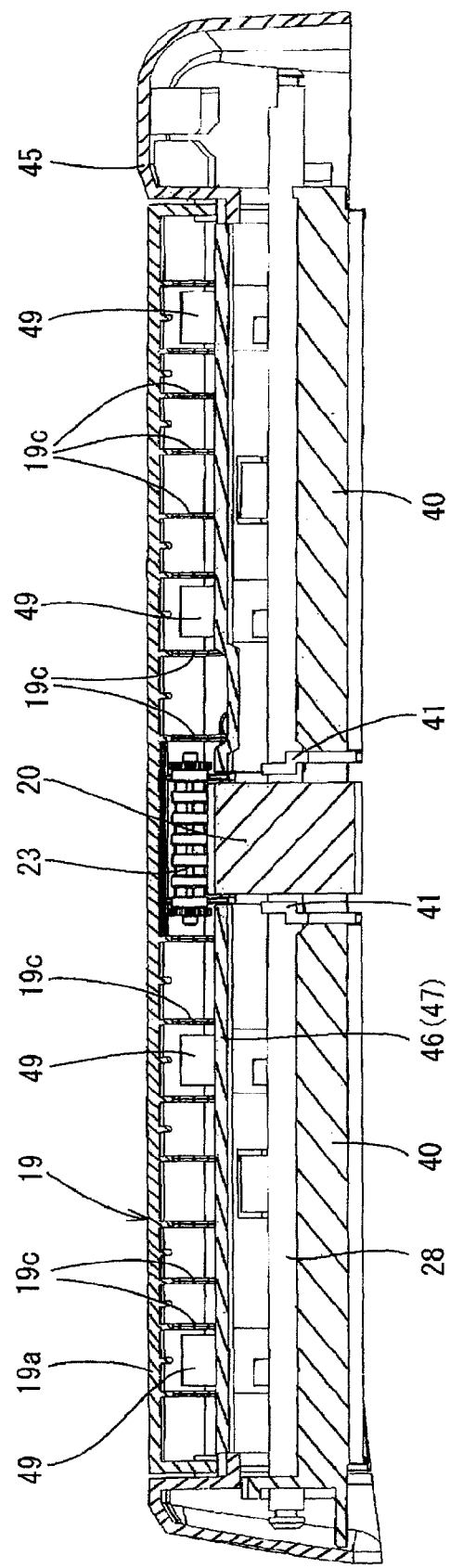
FIG. 7 is a cross-sectional view taken along the line VII-VII in FIG. 6.
Figure 8:
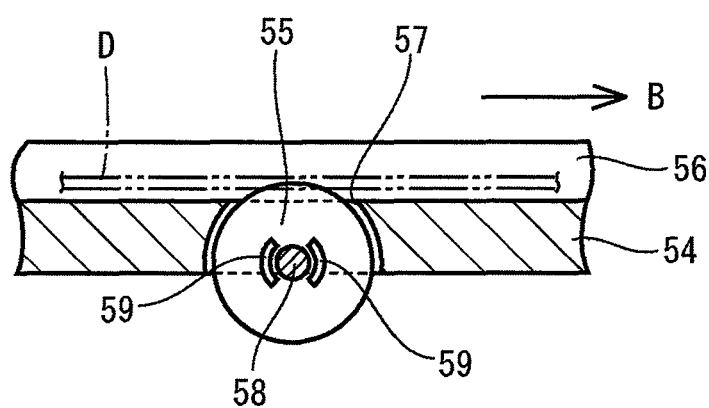
FIG. 8 is an enlarged cross-sectional view showing a rotating member.

Referring to FIG. 4 and FIG. 7, pressing members 40 may be formed into a substantially semi-arcuate shell shape projecting downward, and may be integrally formed with resilient hook members 41 directed upward on the side closer to the both right and left sides of the reverse roller 20. Resilient hook members 41 may be fitted to each end of drive shaft 28 and are hung therefrom. Accordingly, the heightwise position of the lower surface of pressing members 40 with respect to glass panel 6 may be secured with a simple configuration.

Also, by bonding a white tape or by applying white coating material on the lower surface of pressing members 40, in an area including scanning position Re, detection of reference chromaticity and luminance in scanning device 8 may be achieved.

A discharge guiding device may guide subsequent document D in between paper discharge tray portions 14 and the previously discharged documents D stacked in the same order. When document D, after having been scanned, may make a U-turn and be discharged to paper discharge auxiliary guide panel 29 and then paper discharge tray portions 14 on the upper side of reverse roller 20, that is, with the image surfaces of the respective documents D facing up in the third transporting portion and other documents D are already discharged are present on paper discharge tray portions 14. The discharge guiding device, which may be provided in the third transporting portion on the upstream side of the paper discharge tray portions 14 in terms of the document discharging direction, may guide the subsequent document D in between the upper surface of paper discharge tray portion 14 and previously discharged document D.

According to the discharge guiding device in one exemplary embodiment of the invention shown in FIG. 4, in the state in which lid cover member 19 is closed, the heightwise position of the abutment portion between third pinch roller 23 and the upper side of the peripheral surface of reverse roller 20 is higher than front end portion 29a, and is lower than the heightwise position of the upper surface of horizontal portion 29b of the paper discharge auxiliary guide panel 29.

As shown in FIG. 4 and FIG. 7, a pair of fitted members 46 may be arranged on the upper side of the both left and right outer sides in the intermediary of reverse roller 20. Fitted members 46 may be formed substantially into a half cylinder shape, when viewed in cross section, extending in the width direction of documents D. Fitted members 46 may be provided so as to continue from upper ends of pressing members 40, and, thus, cover the drive shaft 28 from above, and fitted members 46 and pressing members 40 may be connected by engaging devices (not shown). Guide members 47 may be formed integrally with an outer peripheral surface of fitted members 46 so as to extend obliquely upward from the position corresponding to the abutment position between third pinch roller 23 and reverse roller 20 toward the downstream side in terms of the transporting direction and being in proximity to front end portion 29a of the paper discharge auxiliary guide panel 29. Uppermost end portions 47a of respective guide members 47 may be positioned higher than the abutment position between third pinch roller 23 and reverse roller 20. In this configuration, document D released from the abutment position between third pinch roller 23 and reverse roller 20 may be guided upward along inclined guide members 47 to uppermost end portions 47a. However, when uppermost end portions 47a are positioned at a lower level than the horizontal portion 29b, subsequent document D may be guided and transported in such a manner that the leading edge thereof approaches to the underside of the lowermost document D from among the previously discharged documents D and slips over the paper discharge auxiliary guide panel 29, whereby discharged documents D may be stacked in the same order as those having been placed on paper feeding tray portion 13.

As shown in FIGS. 6-7, in addition to, or instead of guide members 47, resilient supporting strips 49 may be provided for lifting document D from the abutment position between the third pinch roller 23 and the reverse roller 20. Resilient supporting strips 49 may be formed of resilient panel members of elastic synthetic resin, such as PET (polyethylene terephthalate), having a thickness of approximately 0.2 mm to 1 mm, and are bent substantially into an L-shape. Proximal portions of resilient supporting strips 49 may be fixed with an adhesive agent or the like to depressed portions 46a formed at suitable positions of the outer peripheral surface of fitted members 46 in terms of the width direction of documents D and at the heightwise position in the vicinity of that of the abutment position between third pinch roller 23 and reverse roller 20. Resilient supporting strips 49 may be arranged so as to incline upward toward the downstream side in terms of the transporting direction to an uppermost edge 49a at a heightwise position higher than horizontal portion 29b, and a free end portion 49b bent downward and extended from uppermost edge 49a is inserted into a groove hole or slit 50 formed on fitted members 46. In this configuration, document D may be released from the abutment position between third pinch roller 23 and reverse roller 20 rides on resilient supporting strips 49, which are bent slightly downward by the weight of document D. Free end portion of the document D lifted by a resilient force of the resilient supporting strips 49 by itself in this state may be discharged toward the upper surface of paper discharge auxiliary guide panel 29. Therefore, the leading edge of the subsequent document D, approaching the underside of previously discharged documents D, may be guided and transported onto the paper discharge auxiliary guide panel 29, so that discharged documents D are stacked in the same order as documents D stacked on paper feeding tray portion 13. Therefore, the operator does not have to change the stacking order of documents D later.

When inclined free end portions 49*b* extending downward of L-shaped resilient supporting strips 49 are inserted into the slit holes 50 formed on the fitted members 46, the positions of free end portions 49*b* may be moved in the vertical direction along slit holes 50 when the document D is placed thereon and resilient supporting strips 49 are bent downward due to its resiliency, the direction of deformation of the resilient supporting strips 49 may be regulated, and, thus, the action of the leading edge of subsequent document D approaching the lower surface of the previously discharged document D may be further ensured.

Referring to FIG. 7, lid cover member 19 may be formed integrally with elongated ribs 19*c* extending along the Y-direction to end edge 19*b* at a suitable pitch in the X-direction on the inner surface of lid cover member 19. By arranging resilient supporting strips 49 between the plurality of ribs 19*c* formed at the suitable positions, the range of vertical movement of the uppermost edge 49*a* may be increased, so that the action of the resilient supporting strips 49 to lift discharged document D may be further ensured.

According to another exemplary embodiment of the invention for stacking the discharged documents D in the same order, a scraping-out roller 51 may be provided at a heightwise position substantially the same as that of the third pinch roller 23, as shown in FIG. 6, for example, and scraping-out rollers 51 may be realized in the form of projections provided on the outer peripheral surface of a cylindrical roller at a suitable pitch in the circumferential direction, such as a roller having a cross section of a spur shape, or in the form of a thin panel-shaped spur and, in this case, the plurality of scraping-out rollers 51 are arranged so as to oppose the outer peripheral surface of fitted members 46 or the outer peripheral surface of reverse roller 20. When scraping-out rollers 51 are opposed to the outer peripheral surface of the fitted members 46, scraping-out rollers 51 may be driven to rotate positively. In this configuration, the leading edge of document D released from the abutment position between third pinch roller 23 and reverse roller 20 may be positively scraped up by the rotation of scraping-out rollers 51, to prevent the leading edge of the document D from curling downward when abutting against inclined front end portion 29*a*, as such curling of document D may result in document D from not being guided smoothly toward horizontal portion 29*b*.

By forming the outer peripheral surface of the fitted members 46 substantially into an arcuate shape, the both end portions of document D, which do not come into sliding contact with reverse roller 20 and hence are curled in the direction of the width of the documents D, are not involved by drive shaft 28, so that document D is guided smoothly along the outer peripheral surface of fitted members 46 in the direction toward the discharge port. The configuration for guiding, described above, is an auxiliary device with respect to a frictional resistance reducing device used for the slipping action, which will be described in detail, as follows.

By reducing frictional resistance between the discharged documents and the paper discharge tray portion, the allowable number of documents to be stacked in discharge tray portions 14 may be increased. In an exemplary embodiment of the invention, as shown in FIGS. 1-3 and FIG. 8, the friction reducing devices each including a plurality of rotating members 55 may be provided on a pair of left and right supporting panels 54 of paper discharge tray portions 14.

Respective supporting panels 54 may project horizontally inward from vertical panels 56 of respective document guides 13*a*. Vertical panels 56 may restrict a position of the discharged document in the widthwise direction. Rotating members 55 may be arranged so as to expose upper portions only partly through upper surfaces of supporting panels 54. In order to do so, bearing portions 59 for rotating shafts 58 of rotating members 55 may be provided underside of mounting holes 57 of supporting panels 54. Therefore, the widthwise dimension of the mounting holes 57 along the direction of discharging documents D, indicated by an arrow B, may be formed to be smaller than the diameter of rotating members 55, which may be mounted on the undersides of supporting panels 54. Also, rotating shafts 58 may extend in a direction along, i.e., parallel, to a sheet surface, which here is orthogonal to discharging direction B, and the plurality of rotating members 55 may be arranged in one row along discharging direction B.

In the configuration as described above, because supporting panels 54 may be integrally formed with the pair of document guides 13*a*, each of which moves in the X-direction, both widthwise ends of discharged document D may be reliably supported by supporting panels 54 only by adjusting the widthwise dimension of document guides 13*a* by adjusting the same in the X-direction.

When subsequent document D is guided in between the upper surface of supporting panels 54 of the paper discharge tray portions 14 and the already discharged documents, the leading edge portion of the subsequent document may be placed on the upper surfaces of rotating members 55 exposed through supporting panels 54. Because rotating members 55 rotate as the subsequent document moves in the discharging direction, the frictional resistance applied when discharging the document may be reduced dramatically in comparison with the case where the document being discharged moves while being in direct contact with the supporting panels 54. In particular, since a force required to cause the document to be slipped in between the lowermost document and the supporting panels 54 may be reduced by the provision of the plurality of rotating members 55, an advantage such that the document can be reliably slipped in between the previously discharged document and supporting panels 54 is achieved.

Figure 9A:
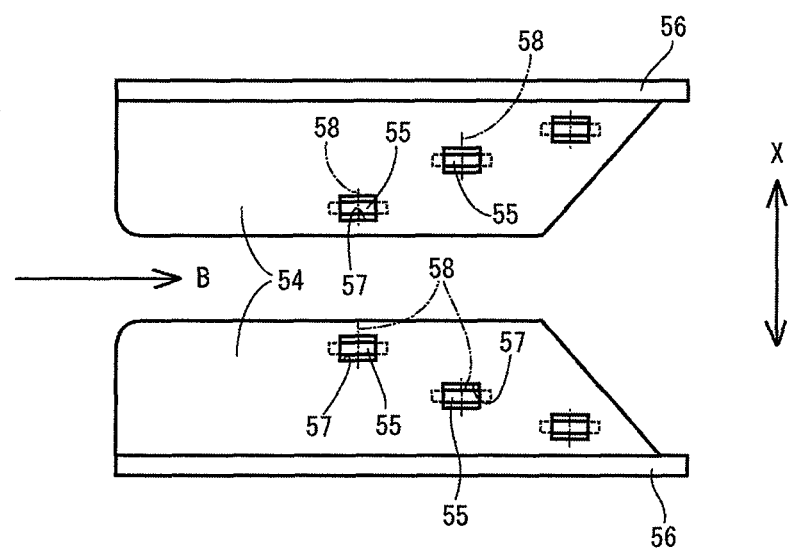
FIG. 9A is a plan view showing an arrangement of the rotating member according to another embodiment of the invention.
Figure 9B:
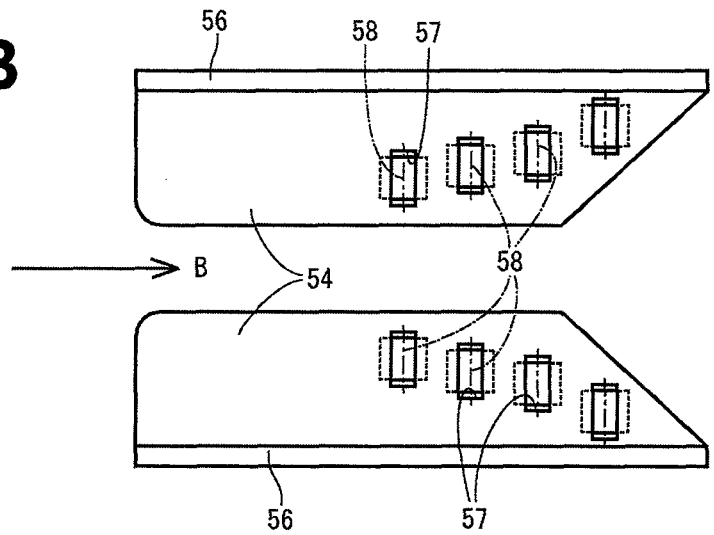
FIG. 9B is a plan view showing the arrangement of the rotating member according to yet another embodiment.

According to another exemplary embodiment of the invention, as shown in FIGS. 9A-9B, the plurality of rotating members 55 as the friction reducing device are not arranged linearly, but may be arranged obliquely so as to approach the both ends of the document in the widthwise direction (X-direction) as it goes downstream in discharging direction B. In other words, a center portion of the document may be supported by the rotating members 55 on the upstream side in discharging direction B, and the both end portions of the document are supported on the downstream side in discharging direction B. A portion between the pair of supporting panels 54 may be a space without any support, and when the plurality of discharged documents are stacked on supporting panels 54, the portions of the lower surface of the lowermost document adjacent this space come into tight contact with the upper surfaces of supporting panels 54. Therefore, the frictional resistance of the leading edge of the subsequent document applied to the supporting panels 54 when it passes in between the lower surface of the lowermost document and the supporting panels 54 is increased, so that slipping-in is difficult to start. Therefore, by arranging the first rotating members 55 on the portion where the frictional resistance is increased, i.e., the portion of the document around the widthwise center thereof and adjacent the space between supporting panels 54, the slipping-in action of the discharged document may be smoothly started. Also, by dispersing the arrangement of the plurality of rotating members 55 in the width direction of the documents, the weight of the stacked document is supported at a plurality of points along the width direction of the documents, which may reduce the frictional resistance applied to the documents when being discharged. Rotating shafts 58 for rotating members 55 may be are arranged so as to extend in the X-direction.

The diameter of rotating members 55 in FIG. 9A is set to be larger than the diameter of the rotating members 55 in FIG. 9B. By increasing the diameter of the rotating members 55 to reduce the height of rotating members 55 to be exposed through the surface of supporting panels 54, the abutment angle of the leading edge of the discharged document with respect to the outer peripheral surfaces of rotating members 55 when hitting the same becomes a larger obtuse angle, which may reduce the frictional resistance applied to the documents when being discharged, as well.

Figure 10:
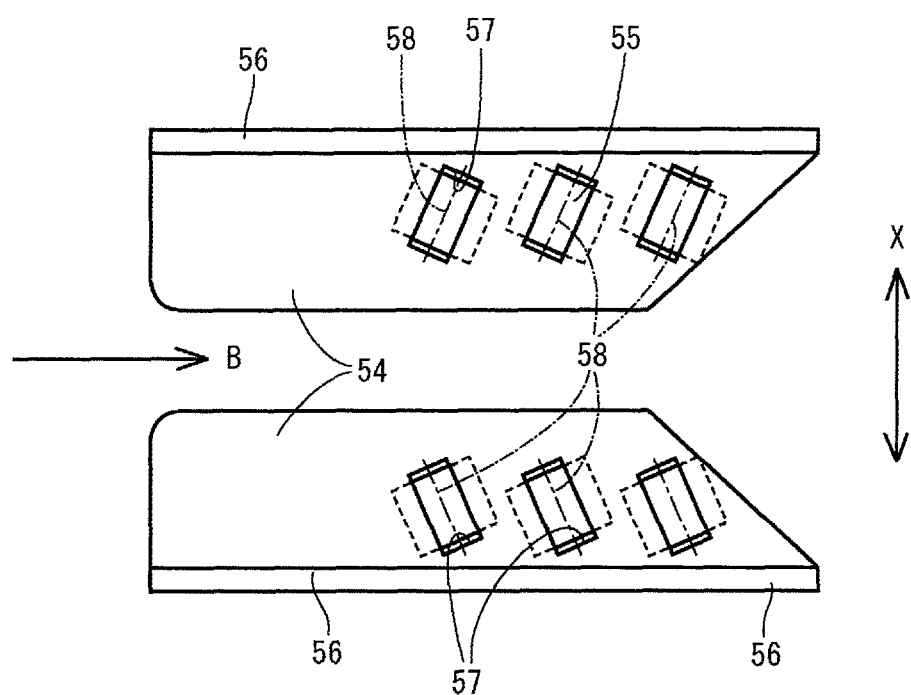
FIG. 10 is a plan view showing the arrangement of the rotating member according to a still another embodiment of the invention.

According to a yet another exemplary embodiment of the invention, as shown in FIG. 10, the plurality of rotating members 55 may be linearly arranged, and rotating shafts 58 may be arranged so as to extend at an angle relative to the X-direction and oriented so that the upstream ends of rotating members 55 are toward the center of the discharged and stacked document on supporting panels 54. In this configuration, when the subsequently discharged document starts to slip under the lowermost previously discharged document, the leading edge of the subsequently discharged document rides first on the portions of rotating members 55 closer to the center of the document in the X-direction, which also may reduce the frictional resistance applied to the documents when being discharged.

Although supporting panels 54 extend horizontally at the same level along the document discharging direction in the embodiments described above, supporting panels 54 may be inclined so as to be lower on the upstream side than the downstream side along discharging direction B. Frictional resistance at the beginning of the slipping of the subsequently discharged document under the lowermost document is increased excessively if the height of the supporting panels 54 is higher on the upstream side than on the downstream along discharging direction B. By lowering the height of supporting panels 54 on the upstream side, the subsequently discharged document may more easily start to slip under the lowermost document.

The invention is applicable to an operation such as a printing job when sheets transported separately one by one from a sheet feed tray in which a number of partly printed sheets or printed media are stacked by a predetermined order, so that sheets discharged after a printing operation are in the same order as the predetermined order in the sheet feed tray.

Figure 11:
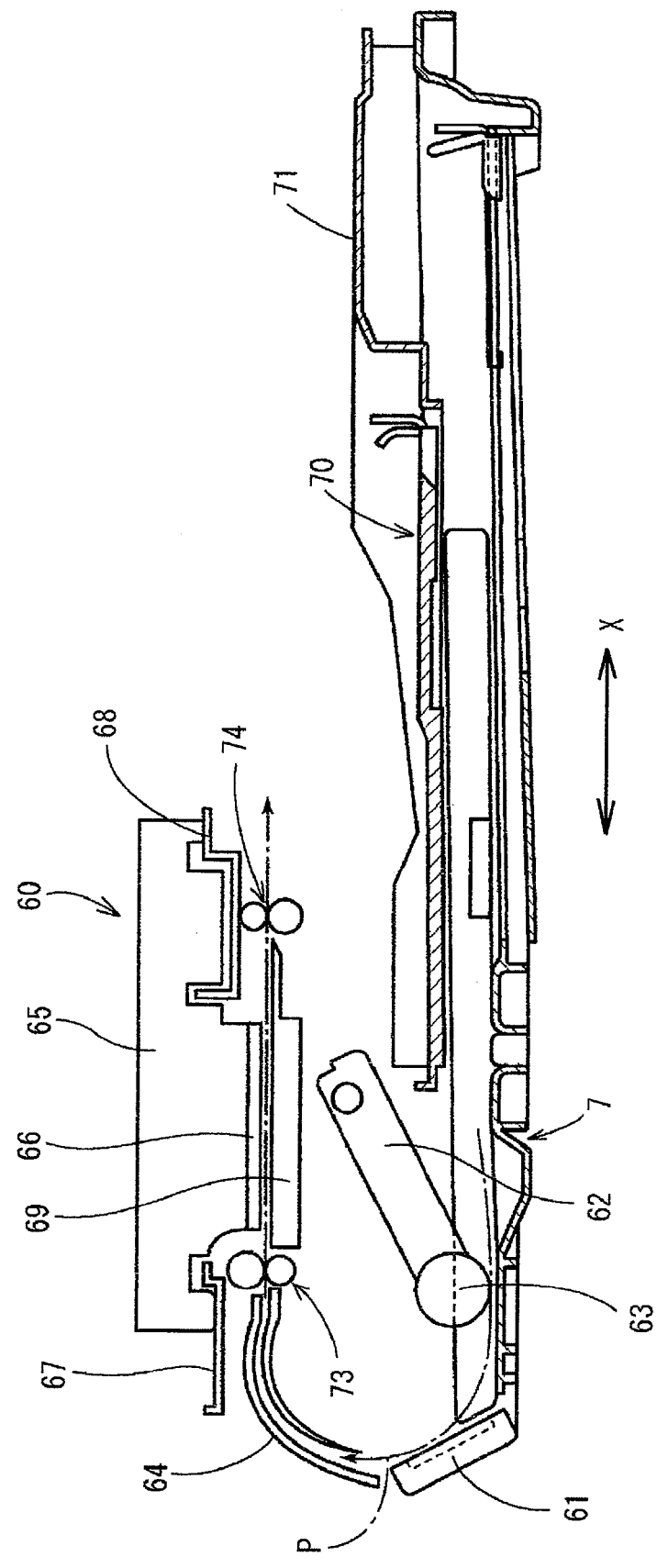
FIG. 11 is a schematic cross-sectional view of a paper-feeding cassette and a printer.

In one such exemplary embodiment of the invention, as shown in FIG. 1 and FIG. 11, paper-feeding cassette 7 may store paper or printed media P of various sizes, e.g., A4 size, letter size, legal size, or post card size, to be stacked and stored with the short side thereof extended in parallel to the primary scanning direction along the Y-axis. The printed media may be transported in the secondary scanning direction along the X-axis. A paper discharge tray 71 may be provided on the upper surface of the paper-feeding cassette 7. Paper discharge tray 71 also may serves as an auxiliary feeding tray 70 which allows a plurality of small size papers P, such as, for example, post cards or regular picture size (89 mm×127 mm) to be stored, and is provided so as to be movable along the X-axis direction.

An inclined separating panel 61 for separating the sheets of paper P may be arranged on the inner side of paper-feeding cassette 7. An arm member 62, the upper end portion of which is rotatable in the vertical direction, may be mounted on the side of body case 4 so that papers P stacked in the paper-feeding cassette 7 are separated and transported one by one by a paper feeding roller 63 that may be provided at the lower end of arm member 62 and inclined separating panel 61 and together act as a transporting device. Separated papers P may be delivered to printer 60 provided above paper-feeding cassette 7 via a U-turn pass or feeding path 64 extending upward and then back towards cassette 7 along the X-direction. Printer 60 may include a reciprocal carriage 65 on which an ink jet type printhead 66 for executing a printing function or a copying function is mounted thereon. Papers P printed by printer 60 may be discharged and stacked on paper discharge tray 71 with the printed surface facing up. Printed papers P stacked on the paper discharge tray 71 may be retrieved via opening 4a.

Carriage 65 may be supported by a main frame formed of a metallic panel, not shown. Carriage 65 is slidably supported by upstream guide member 67 and downstream guide member 68 extending along the primary scanning direction, i.e., the Y-axis direction, so as to be capable of moving reciprocally. A timing belt, driven by a motor, may be arranged on the upper surface of downstream guide member 68 in parallel thereto for moving the carriage 65 reciprocally along the primary scanning direction. A substantially flat panel-shaped platen 69 may be configured to support transported papers P positioned under printhead 66, and an encoder strip (not shown) may be arranged to extend in the primary scanning direction for sensing the position of the carriage 65 relative to the main scanning direction.

A resist roller pair 73 may be arranged on the upstream side of platen 69 to feed the paper P onto platen 69 beneath printhead 66. A paper discharge roller pair 74, which may include a spur roller that comes into contact with the upper surface of paper P and a paper discharge drive roller on the lower surface of paper P, may be arranged on the downstream side of platen 69, and printed paper P is transported onto paper discharge tray 71.

Figure 12A:
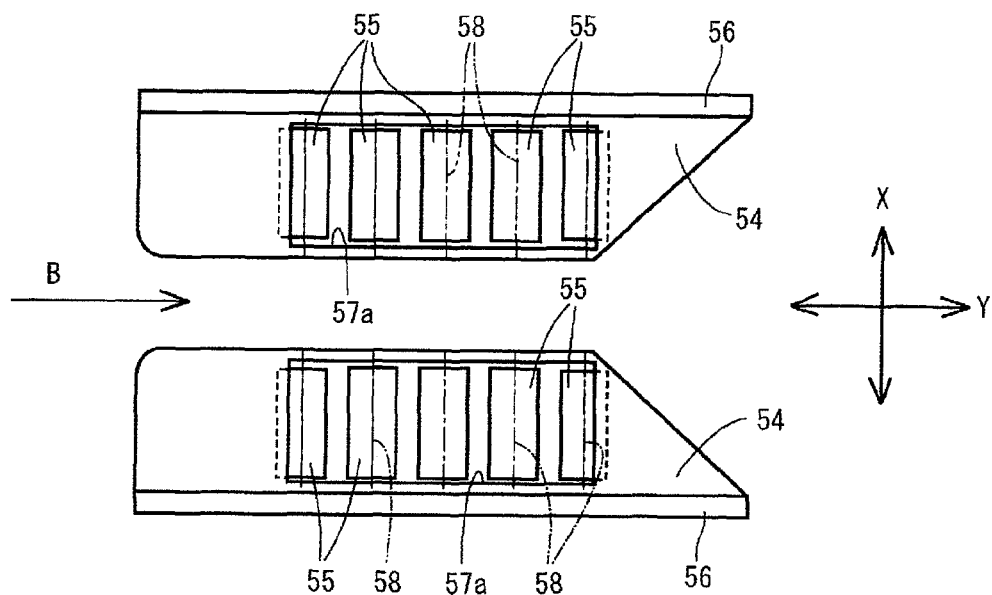
FIG. 12A is a plan view showing an arrangement of the rotating member according to still yet another embodiment of the invention.
Figure 12B:
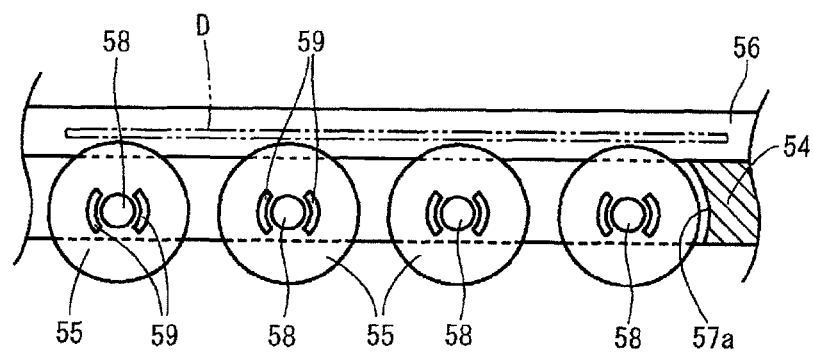
FIG. 12B is a partially enlarged cross-sectional view of the rotating member according to still yet another embodiment of the invention.

In previously described embodiments of the invention, peripheral surfaces of rotating members 55 are partly exposed through the upper surface of supporting panels 54, but the invention is not limited thereto. For example, rotating members 55 may be arranged on the surface of the supporting panels 54. Referring to FIGS. 12A-2B, rotating members 55 may each have a length substantially the same as the width of supporting panels 54 in the X-axis direction. Rotating members 55 may be adjacently arranged so as to cover the surface of the supporting panels 54 with gaps therebetween. These gaps between adjacently arranged rotating members 55 may be set to be smaller than the radius of rotating members 55.

Furthermore, the supporting panels 54 may be configured only with a frame, or supporting panels 54 may be formed with an opening 57a having a length slightly shorter than the length of the supporting panels 54 in the Y-direction, and a number of the rotating members 55 may be arranged within the frame or in the opening 57a with gaps smaller than the radius of rotating members 55. Rotating shafts 58 of rotating members 55 may be parallel to or at and angle relative to the X-axis direction, and bearing portions 59 may be provided within the thickness of supporting panels 54 to allow rotation of rotating members 55.

It will be understood easily that when a number of the rotating members 55 are arranged with little gaps or with gaps smaller than the radius of the respective rotating members 55, the frictional resistance applied to paper P is further reduced.

While the invention has been described in connection with preferred embodiments, it will be understood by those of ordinary skill in the art that other variations and modifications of the preferred embodiments described above may be made without departing from the scope of the invention. Other embodiments will be apparent to those skilled in the art from a consideration of the specification or practice of the invention disclosed herein. It is intended that the specification and the described embodiments only are considered as exemplary embodiment of the invention, with the true scope of the invention being defined by the following claims.

What is claimed is:

1. An automatic sheet transporting apparatus comprising:
   a transporting unit comprising a discharge roller, the transporting unit being configured to discharge a sheet;
   a discharge tray configured to support at least one sheet discharged from the transporting unit in a stack, the discharge tray including an upstream end and a downstream end;
   a discharge guide positioned on a portion of the discharge tray that is closer to the upstream end than the downstream end in a sheet discharging direction, the discharge guide being configured to guide a subsequent sheet transported by the transporting unit to a position between the discharge tray and a bottom surface of a previously discharged sheet in the stack; and
   at least one rotating member positioned in another portion of the discharge tray that is closer to the downstream end than the upstream end in the sheet discharging direction, the at least one rotating member being configured to be driven to rotate by the subsequent sheet when the discharge guide guides the subsequent sheet to the position between the discharge tray and the bottom surface of the previously discharged sheet in the stack,
   wherein the at least one rotating member comprises a plurality of rotating members spaced at a predetermined interval along the sheet discharging direction.

2. The automatic sheet transporting apparatus according to claim 1, wherein:
   the discharge tray comprises a supporting surface on which the at least one discharged sheet is supported; and
   a portion of a peripheral surface of the at least one rotating member projects through an opening formed through the supporting surface.

3. The automatic sheet transporting apparatus according to claim 2, wherein the at least one rotating member is driven to rotate when the subsequent sheet contacts the portion of the peripheral surface that projects through the opening of the supporting surface.

4. The automatic sheet transporting apparatus according to claim 1, wherein the at least one rotating member is arranged to rotate in the sheet discharging direction.

5. The automatic sheet transporting apparatus according to claim 1, wherein the at least one rotating member comprises a rotating shaft intersecting the sheet discharging direction, the rotating shaft is arranged to extend along a direction parallel to a surface of the subsequent sheet.

6. The automatic sheet transporting apparatus according to claim 1, wherein the plurality of rotating members are arranged linearly along the sheet discharging direction.

7. The automatic sheet transporting apparatus according to claim 1, wherein:
   the plurality of rotating members are arranged obliquely relative to the sheet discharging direction; and
   a distance between each rotating member and a widthwise end of the discharge tray decreases along the sheet discharging direction.

8. The automatic sheet transporting apparatus according to claim 1, wherein:
   the discharge tray comprises a pair of supporting panels configured to support both widthwise end portions of discharged sheets; and
   the at least one rotating member comprises at least one pair of rotating members and a portion of the peripheral surface of each rotating member of the at least one pair of rotating members projects through at least one opening formed through a corresponding surface of each supporting panel of the pair of supporting panels.

9. The automatic sheet transporting apparatus according to claim 8, wherein each supporting panel of the pair of supporting panels is movable in a direction intersecting the sheet discharging direction.

10. The automatic sheet transporting apparatus according to claim 8, wherein an upstream portion of each one of the pair of supporting panels is lower than a downstream portion of each one of the pair of supporting panels in the sheet discharging direction.

11. The automatic sheet transporting apparatus according to claim 1, further comprising a stopper member configured to contact a leading edge of sheets discharged onto the discharge tray.

12. The automatic sheet transporting apparatus according to claim 1, further comprising a feeding tray from which the transporting unit discharges a sheet,
    wherein the discharge tray is disposed above the feeding tray, such that a portion of the discharge tray covers a portion of the feeding tray.

13. The automatic sheet transporting apparatus according to claim 1, further comprising a feeding tray from which the transporting unit discharges a sheet,
    wherein a surface of the discharge tray configured to support at least one sheet is substantially parallel to a surface of the feeding tray configured to support the sheet to be discharged by the transporting unit.

14. An automatic document scanning apparatus comprising:
    an automatic document transporting apparatus comprising:
    a transporting unit comprising a discharge roller, the transporting unit being configured to discharge a sheet;
    a discharge tray configured to support at least one sheet discharged from the transporting unit in a stack, the discharge tray including an upstream end and a downstream end;
    a discharge guide positioned on a portion of the discharge tray closer to the upstream end than the downstream end in a sheet discharging direction, the discharge guide being configured to guide a subsequent sheet transported by the transporting unit to a position between the discharge tray and a bottom surface of a previously discharged sheet in the stack; and
    at least one rotating member positioned in another portion of the discharge tray closer to the downstream end than the upstream end in the sheet discharging direction, the at least one rotating member being configured to be driven to rotate by the discharge sheet when the discharge guide guides the subsequent sheet to the position between the discharge tray and the bottom surface of the previously discharged sheet in the stack;

a scanning member configured to scan an image on the subsequent sheet at a scanning position; and a reversing member configured to reverse a conveying direction of the subsequent sheet from the scanning position to the sheet discharging direction, wherein the at least one rotating member comprises a plurality of rotating members spaced at a predetermined interval along the sheet discharging direction.

15. An automatic document scanning apparatus according to claim 14, wherein:

the discharge tray comprises a pair of supporting panels configured to support both widthwise end portions of the discharged sheets; and the at least one rotating member comprises at least one pair of rotating members and the part of the peripheral surface of each rotating member of the at least one pair of rotating members projects through a corresponding surface of one supporting panel of the pair of supporting panels; and each one of the pair of supporting panels is movable in a direction intersecting the sheet discharging direction.

16. An automatic document scanning apparatus according to claim 15, wherein each one of the pair of supporting panels comprises a width-restricting panel configured to position sheets in a widthwise direction orthogonal to the sheet discharging direction, and the width-restricting panel is configured to move with a corresponding one of the pair of supporting panels in the widthwise direction.

17. An automatic sheet transporting apparatus comprising:

a discharge tray including an upstream end and a downstream end;

a transporting means comprising a discharge roller for discharging a sheet onto the discharge tray;

a discharge guide means positioned on a portion of the discharge tray that is closer to the upstream end than the downstream end in a sheet discharging direction for guiding a subsequent sheet transported by the transporting unit to a position between the discharge tray and a bottom surface of another sheet previously discharged onto the discharge tray; and at least one means for reducing frictional resistance applied to the subsequent sheet that contacts the subsequent sheet when the subsequent sheet is guided by the discharge guide means to the position between the discharge tray and the bottom surface of the previously discharged sheet, the at least one means for reducing frictional resistance being provided in another portion of the discharge tray closer to the downstream end than the upstream end in the sheet discharging direction, wherein the at least one means for reducing frictional resistance comprises a plurality of rotating members spaced at a predetermined interval along the sheet discharging direction.

* * * * *